United States Patent
McConaghy et al.

(10) Patent No.: US 10,331,823 B2
(45) Date of Patent: Jun. 25, 2019

(54) METHOD AND SYSTEM OF FAST NESTED-LOOP CIRCUIT VERIFICATION FOR PROCESS AND ENVIRONMENTAL VARIATION AND HIERARCHICAL CIRCUITS

(71) Applicant: SOLIDO DESIGN AUTOMATION INC.

(72) Inventors: Trent Lorne McConaghy, Berlin (DE); Joel Cooper, Saskatoon (CA); Jeffrey Dyck, Saskatoon (CA); Megan Marsh, Saskatoon (CA)

(73) Assignee: Mentor Graphics Corporation, Wilsonville, OR (US)

( * ) Notice: Subject to any disclaimer, the term of this patent is extended or adjusted under 35 U.S.C. 154(b) by 443 days.

(21) Appl. No.: 15/031,314

(22) PCT Filed: Oct. 24, 2014

(86) PCT No.: PCT/CA2014/051034
§ 371 (c)(1),
(2) Date: Apr. 22, 2016

(87) PCT Pub. No.: WO2015/058310
PCT Pub. Date: Apr. 30, 2015

(65) Prior Publication Data
US 2016/0275223 A1 Sep. 22, 2016

Related U.S. Application Data

(60) Provisional application No. 61/895,051, filed on Oct. 24, 2013.

(51) Int. Cl.
*G06N 7/00* (2006.01)
*G06F 11/07* (2006.01)
*G06F 17/50* (2006.01)

(52) U.S. Cl.
CPC ........ *G06F 17/5022* (2013.01); *G06F 11/076* (2013.01); *G06F 11/0745* (2013.01);
(Continued)

(58) Field of Classification Search
CPC ............... G06F 17/5022; G06F 11/076; G06F 11/0745; G06F 17/5036; G06F 2217/80; G06F 2217/78; G06N 7/005
(Continued)

(56) References Cited

U.S. PATENT DOCUMENTS

| 8,155,938 B2 | 4/2012 | Singhee et al. |
| 2007/0198956 A1* | 8/2007 | Liu ..................... G06F 17/5036 716/54 |

FOREIGN PATENT DOCUMENTS

| CN | 1563966 A | 5/2012 |
| WO | 2012055045 | 5/2012 |

OTHER PUBLICATIONS

McConaghy et al., "Chapter 5 High-Sigma Verification and Design the Accuracy of Five Billion Monte Carlo Samples in Minutes", Variation-Aware Design of Custom Integrated Circuits: A Hands-on Field Guide, DOI: 10.1007/978-1-4614-2269-3_5, Sep. 26, 2012, pp. 115-167.

(Continued)

*Primary Examiner* — Saif A Alhija
(74) *Attorney, Agent, or Firm* — Mentor Graphics Corporation (57) ABSTRACT

A computer-implemented method for quickly analyzing the effect of process, voltage, temperature, and other variations when the variation analysis or circuit structure can be hierarchically composed into nested loops. The method has two main steps: first, it hierarchically generates a set of points and inserts them into a flat list of tuples, where each tuple contains a point from each level in the looping hier- (Continued)

archy. Second, it efficiently identifies and simulates failing tuples with the assistance of modeling to order the tuples to simulate. By using the present method, a designer does not have to simulate the full ECD at each and every statistical process point or PVT corner, which can same considerable time or compute effort.

19 Claims, 8 Drawing Sheets

(52) U.S. Cl.
CPC ......... *G06F 17/5036* (2013.01); *G06N 7/005* (2013.01); *G06F 2217/78* (2013.01); *G06F 2217/80* (2013.01)

(58) Field of Classification Search
USPC .......................................................... 703/14
See application file for complete search history.

(56) References Cited

OTHER PUBLICATIONS

Singhee et al., Statistical Blockade: A Novel Method for Very Fast Monte Carlo Simulation of Rare Circuit Events, and its Application, Dept. of ECE, Carnegie Mellon University, Apr. 2008, 6 pages.
International Patent Application No. PCT/CA2014/051034 International Search Report and Written Opinion dated Jan. 2, 2015.

\* cited by examiner

METHOD AND SYSTEM OF FAST NESTED-LOOP CIRCUIT VERIFICATION FOR PROCESS AND ENVIRONMENTAL VARIATION AND HIERARCHICAL CIRCUITS

FIELD

The present disclosure relates generally to electrical circuit designs. More particularly, the present disclosure relates to designing electrical circuits under statistical process variations, voltage variations and temperature variations. It is particularly beneficial for verification of hierarchically organized circuits such as memory columns and memory arrays, and for statistical analysis of circuits with a large number of voltage/temperature (VT) corners.

BACKGROUND

Process variations, and voltage and temperature variations are uncontrollable factors that can degrade the performance, power, area, and yield of integrated circuits. In order to design circuits with acceptable power, performance, area and yield, circuit designers must manage these variations on large circuits, in aggressive time schedules. "Variation-aware" tools aim to help designers with these goals, and include Monte Carlo samplers, and many more advanced tools.

Currently available variation-aware design tools are unable to handle: (a) statistical process variation, (b) voltage, temperature, and other uncontrollable factors in the circuit's operating environment ("environmental variation"), (c) very large circuits, which are often hierarchically organized, (d) circuits with a very low probability of failure, and (d) hundreds, thousands or more voltage and temperature (VT) corners.

Therefore, improvements in variation-aware design tools are desirable.

SUMMARY

In a first aspect, there is provided a computer-implemented method to identify failures of an ECD, the ECD defining a plurality of sub-circuits, each sub-circuit being the same, the ECD having associated thereto global process variables, each sub-circuit having associated thereto sub-circuit process variables, each sub-circuit having associated thereto a performance metric, the performance metric being dependent on the global process variables and on the sub-circuit process variables, the ECD having a failure criteria that depends on the performance metric, the global process variables having associated thereto a probability distribution of the global process variables, the sub-circuit process variables having associated thereto a probability distribution of the sub-circuit process variables. The computer-implemented method comprises: generating a set of global process points from the probability distribution of the global process variables; generating a set of sub-circuit process points from the probability distribution of the sub-circuit process variables; generating a set of tuples by combining each point of the set of global process points with each point of the set of sub-circuit process points, each tuple comprising one global process point and one first sub-circuit process point; simulating one of the sub-circuits at selected tuples to obtain simulation data, non-simulated tuples being remaining tuples; in accordance with the simulation data, calculating a simulated performance metric value of the sub-circuit for each of the selected tuples; in accordance with the simulated performance metric values, building a model of the performance metric as a function of the global process variables and as a function of the sub-circuit process variables; calculating, in accordance with the model, a modeled performance metric value for each remaining tuple; ordering the remaining tuples as a function of the modeled performance metric values to obtain ordered remaining tuples; calculating a number of ECD failures by: selecting a predetermined number of ordered remaining tuples to obtain selected ordered remaining tuples, the selected ordered remaining tuples being the remaining tuples that have a modeled performance metric value that is worse than that of any of the non-selected ordered remaining tuples; simulating the sub-circuit at the selected ordered remaining tuples to obtain additional simulation data; calculating, as a function of the additional simulation data, a performance metric value of the sub-circuit performance metric for each of the selected ordered remaining tuples; comparing the performance metric value of each of the selected ordered remaining tuples with a target value of the performance metric; and when the performance metric value of a selected ordered remaining tuple does not meet the target value of the performance metric, augmenting a number of ECD failures by one; and displaying at least one of the number of ECD failures and an estimated yield of the ECD, the estimated yield of the ECD being a function of the number of ECD failures.

In a second aspect, there is provided a computer-implemented method to identify failures of an ECD, the ECD having associated thereto process variables, environmental variables, and performance metrics, the performance metrics being dependent on the process variables and on the environmental variables, the environmental variables having associated thereto a series of pre-defined corners, the process variables having a probability distribution. The computer-implemented method comprises: generating a set of process points from the probability distribution of the process variables; generating a set of tuples by combining each point of the set of process points with each pre-defined corner, each of the tuples comprising one process point of the set of process points and one pre-defined corner; simulating the ECD at selected tuples to obtain simulation data, non-simulated tuples being remaining tuples; in accordance with the simulation data, calculating a simulated performance metric value for each of the selected tuples; in accordance with the simulated performance metric values, building a model of the performance metric as a function of the process variables and as a function of the environmental variables; calculating, in accordance with the model, a modeled performance metric value for each remaining tuple; ordering the remaining tuples as a function of the modeled performance metric values to obtain ordered remaining tuples; calculating a number of ECD failures by: selecting a predetermined number of ordered remaining tuples to obtain selected ordered remaining tuples, the selected ordered remaining tuples being tuples that have a modeled performance metric value that is worse than that of any of the ordered remaining tuples that have not been selected; simulating the ECD at the selected ordered remaining tuples to obtain additional simulation data; calculating, as a function of the additional simulation data, a performance metric value for each of the selected ordered remaining tuples; comparing the performance metric value of each of the selected ordered remaining tuples with a target value of the performance metric; and when the performance metric value of a selected ordered remaining tuple does not meet the target value of the performance metric, augmenting a number of ECD failures by one; and displaying at least one of the number of ECD failures and an estimated yield of the ECD, the estimate yield of the ECD being a function of the number of ECD failures.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure relates to analyzing electrical circuits under statistical process variations and under voltage and temperature variations. It is particularly beneficial for verification of hierarchically organized circuits such as memory columns and memory arrays, and for statistical analysis of circuits with a large number of voltage/temperature (VT) corners. The method has two main steps: first, it hierarchically generates a set of process points and/or VT points, and inserts them into a flat list of tuples, where each tuple contains a point from each level in the looping hierarchy. Second, it efficiently identifies and simulates failing tuples with the assistance of modeling to order the tuples to simulate.

Figure 1:
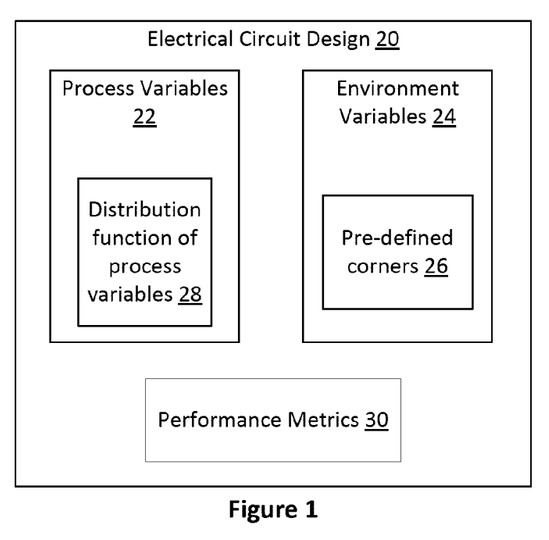
FIG. 1 shows a block diagram of an electrical circuit design.

FIG. 1 shows a box diagram representing an (ECD) 20 that has associated thereto process variables 22 and environment variables 24. The process variables 22 are random in nature and pertain to the process steps involved in manufacturing the ECD. Such variables can include, for example, gate oxide thickness, substrate doping concentration, sheet resistance, mobility, and fluctuations in device length and width, which can ultimately affect the electrical characteristics and performance metrics of the ECD. Each of the process variables can have an associated distribution describing the variation in process variable. The ECD can have associated thereto an n-dimensional distribution that describes the variations in "n" process variables. The distribution may be of Gaussian shape or of any other suitable shape. The environment variables 24 include environment conditions under which the ECD needs to operate. Examples of environment variables include voltages, temperatures, resistance/capacitor parasitics, power settings, etc. The ECD 20 also has as set of pre-defined corners 26, which describe extreme environment points at which the ECD should meet specs. The ECD 20 is also shown with performance metrics 30, which can be a function of the process variables 22 and of the environment variables 24. Examples of performance metrics include power consumption, read current, gain, etc.

Figure 2:
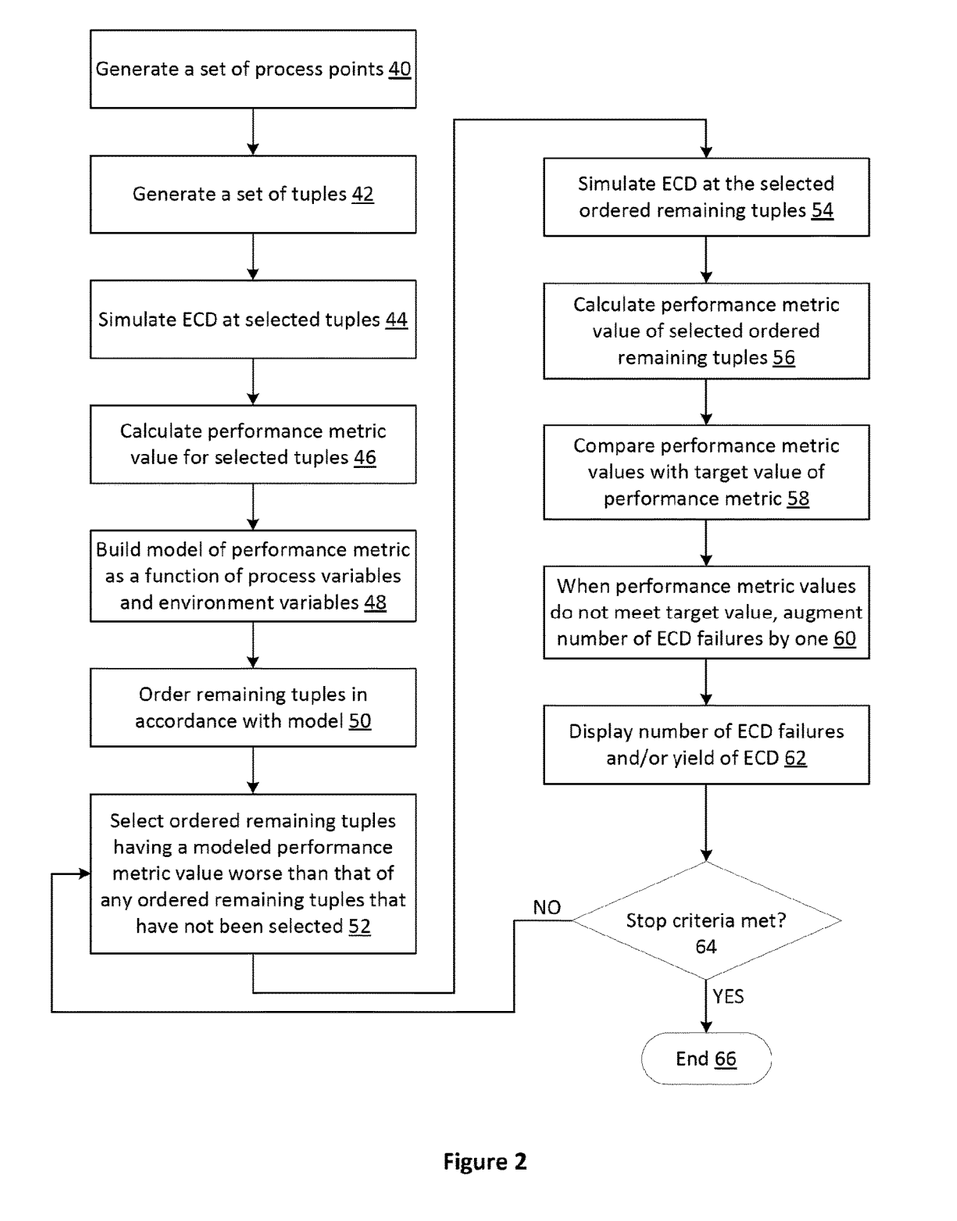
FIG. 2 shows a flowchart of an embodiment of a computer-implemented method in accordance with the present disclosure.

FIG. 2 shows flowchart of a computer-implemented method to identify failures of an ECD in accordance with an embodiment of the present disclosure. At action 40, a set of process points of the ECD is generated. This can be done sampling (e.g., Monte Carlo sampling) the probability distribution of the process variables. The probability distribution will have a dimensionality equal to the number of process variables.

At action 42, a set of tuples is generated with each tuple comprising a process point generated at action 40, and an environment pre-defined corner of the ECD (see reference numeral 26 at FIG. 1). The total number of tuples generated is equal to the product of the number of process points generated at action 40 times the number of environment corners.

At action 44, the ECD is simulated at selected tuples generated at action 44. The number of tuples selected is less than the total number tuples. For example, the number of tuples can range from 10-100. The selection of the tuples can be based on the process variables values of the tuples and/or on the environment corer values. For example, the selection of the tuples can be based on the process variable values (probability values) being lower than a threshold value. Alternatively, in other embodiments, the selection of the tuples can be based on the environment corners point being equally distributed about an average value of the environment corner points. The simulation of the ECD can be effected using any suitable simulation program such as, for example, a SPICE circuit simulator (SPICE: Simulation Program with Integrated Circuit Emphasis). At action 46, a value of a performance metric of the ECD is calculated for each of the tuples that was simulated at action 44. The performance metric has associated thereto a target performance metric value that must be met in order for the ECD to pass testing, otherwise, the ECD fails. An ECD will typically have a series of performance metrics associated thereto and in order for the ECD to pass testing, the ECD must be such that all the performance metrics meet their respective target performance metric value.

At action 48, a regression model of the performance metric of the ECD, as a function of the process variables and of the environment variables, is built in accordance with the performance metric values obtained at action 46. The regression model can be of any suitable type, such as, for example linear models, polynomial models, spline models, Gaussian process models, neural networks, MARS models (J. H. Friedman, Multivariate Adaptive Regression Splines, Annals of Statistics, Vol. 19, No. 1, 1991), fast function extraction (FFX) models (T. McConaghy, High-dimensional statistical modeling and analysis of custom integrated circuits, Proc. Custom Integrated Circuits Conference, September 2011), or combinations thereof; these are all within the scope of the present disclosure.

At action 50, the tuples that have not been used in building the model at action 48 are ordered as a function of the model. That is, the performance metric value of each tuple is calculated with the model and the tuples are ordered in accordance with their modeled performance metric values.

The ordering is, with respect to a target performance metric values, from the worse to the best.

Actions 52-60 are to calculate the number of ECD failures. At action 52, a batch of ordered tuples is selected (e.g., 10-1000 tuples). These are selected from the tuples that were not used to build the model at action 48. The selection of these tuples is based on which remaining tuples (the tuples not used to build the model) have the worst performance metric values. For example, when the remaining tuples are ordered in decreasing order starting with the tuple having the worst modeled performance metric value, the first 10-1000 (as an example) are selected. At action 54, the ECD is simulated at the tuples selected at action 52 and a performance metric value of the ECD at these simulated tuples is calculated at action 56. At action 58, a comparison between these calculated values and a target performance metric value is effected. At action 60, a number of the instances of failure of the ECD is updated each time tuple fails to meet the target performance metric value.

At action 62, a display of ECD failures and/or yield of the ECD is presented. This takes place on a display device operationally connected to the processor or processors that are carrying out actions 40-62.

The method depicted at FIG. 2 may also include action 64, which determines if a stop criteria has been met. When the stop criteria has been met, the method ends at action 66. When the stop criteria has not been met, the method loops back to action 52 where the next batch of ordered remaining tuples is selected. For example, if the first batch of ordered remaining tuples contained tuples 1-100, the next batch will include tupels 101-200. Examples of stop criteria include: a user of the method stopping the computer-implemented method; the number of simulations (number of tuples) exceeds a threshold number of simulations; the runtime of the computer-implemented method has surpassed a maximum runtime; the number of ECD failures exceeds a maximum value; the lower bound of an estimated yield is higher than a threshold value; the upper bound of the estimated yield of the ECD is lower than a threshold value; etc. Optionally, subsequent to the stop criteria not being met at action 64, the model built at action 48 can be updated using the simulation data used obtained at action 54. The then remaining tuples are reordered, at action 50, as a function of the updated model and the computer-implemented method proceed to action 52 et seq.

Figure 3:
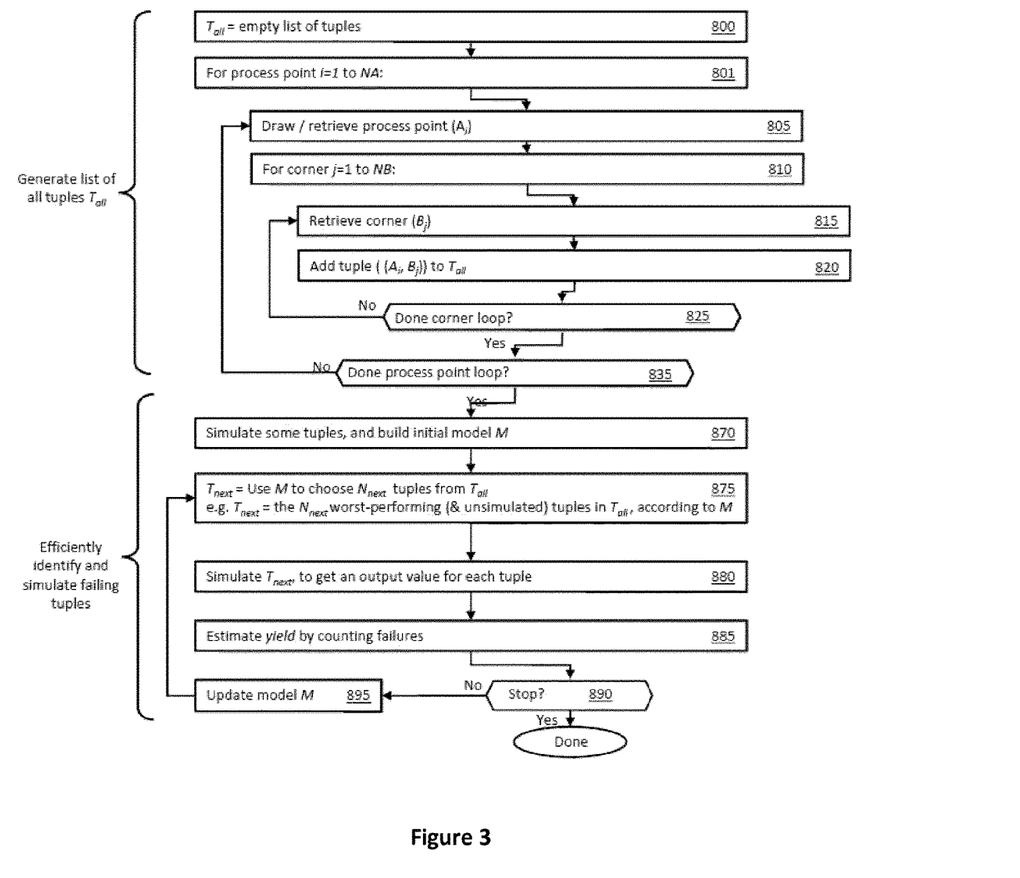
FIG. 3 shows a flowchart of another embodiment of a computer-implemented method in accordance with the present disclosure.

FIG. 3 shows a flowchart of another embodiment of a computer-implemented method to identify failures of an ECD in accordance with the present disclosure, for the case of two nested loops, where the outer loop does Monte Carlo sampling, and the inner loop covers VT pre-determined corners. Actions 800 to 835 perform the first main step, which is to generate a list of all tuples $T_{all}$. Actions 870 to 895 perform the second main step, to efficiently identify and simulate the failing tuples (a subset of $T_{all}$).

Action 800 initializes $T_{all}$ as an empty list of tuples. In action 801, the outer loop iterates across a set of process points, where each process point $A_i$ is drawn (action 805) from a statistical distribution describing process variation. The inner loop iterates across corners (actions 810 and 815), where each corner $B_j$ is retrieved from a predefined list of PVT corners. Inside this inner loop, a tuple containing the process point $A_i$ and corner is constructed; then this tuple is added to the list of tuples $T_{all}$. This inner loop is repeated for each corner until all corners have been covered, as tested by action 825. The outer loop is repeated for each process point until all process corners have been covered, as tested by action 835.

In FIG. 3 action 870, an initial model is built with data from some pilot simulations. There are various ways to implement action 870. One way is to choose from $T_{all}$ the, for example, $N_{pilot}=1000$ or so tuples that are farthest from nominal (for the case of process points) or typical (for the case of PVT corners). Then, these $N_{pilot}$ tuples are simulated. Finally, a regression model M is constructed that maps a union of all variables (process variables and environment variables) in the tuples, AUB to output V, that is, M=AUB→V. Another approach to action 870 is to continually draw and simulate samples from $T_{all}$, starting with the farthest-from-nominal/typical point in $T_{all}$ then the next-farthest, and so on, until a stopping criteria is met (for example, when five failures are found). The second approach would be to build a classifier model M that maps all variables in the tuples AUB to distance-from-feasible/infeasible boundary d, that is, M=AUB→d. The type of model can be the same as that for the computer-implemented method of FIG. 3.

In the approach of FIG. 3, the next action 875 uses the model M to choose the $N_{next}$ points from all generated process points $T_{all}$. Typically, this is done by running each tuple through the model M, to get an estimate of the output value V. Then, all the tuples in $T_{all}$ are sorted from worst estimated value of V to best value. The $N_{next}$ points in the front of that list (which weren't previously chosen) are the chosen tuples, $T_{next}$. Then, action 880 simulates each tuple in $T_{next}$, to get an output value for each tuple, $V_{next}$. Action 885 estimates the yield, for example as yield=$(1.0-N_F/N_A)$*100%, where $N_F$ is the number different process points that have failed performance specifications and $N_A$ is the total number of process points. To clarify: even if the same process point fails on more than one corner, then it still only counts as one failure when estimating yield. Action 890 determines whether to stop, or continue, based on a stop criteria. One example stopping criterion is maximum number of simulations, e.g. 10K simulations. If it does not stop, then action 895 builds a new model that incorporates the most recent simulations in addition to the previous simulations, and the computer-implemented method loops back to action 875.

Figure 4:
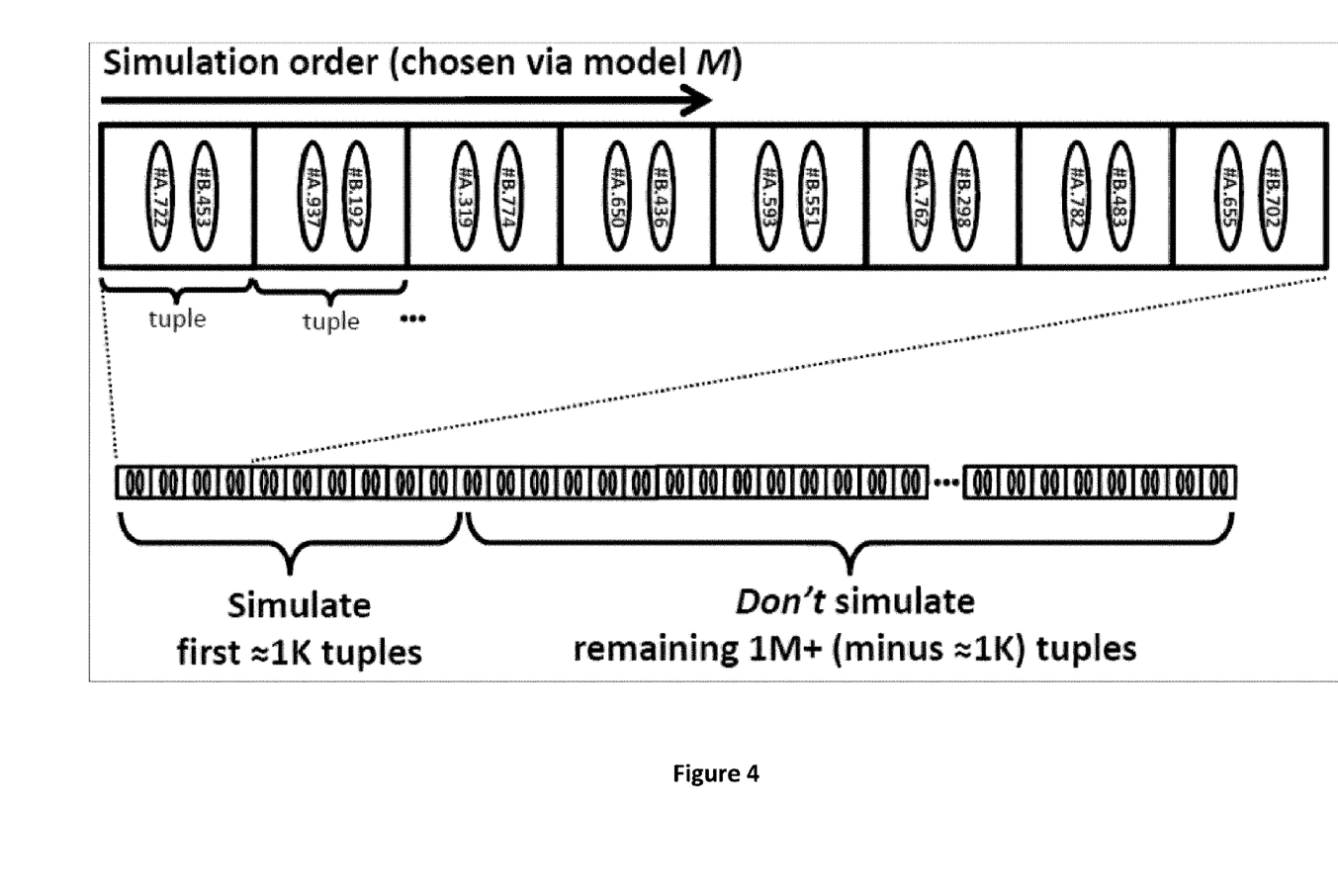
FIG. 4 shows tuples ordered in accordance with the computer-implemented method of FIG. 3.

FIG. 4 illustrates an aspect of behavior of the computer-implemented method of FIG. 3. FIG. 4, at the bottom portion, shows a list of all possible tuples which may number in the millions or billions. FIG. 4, top portion, shows that the computer-implemented method of FIG. 3 orders these samples (tuples) such that the model-predicted worst tuple is simulated first (process point #A.722, PVT corner #B.453), the model-predicted next-worst tuple is simulated next (process point #A.937, PVT corner #B.192), and so on.

FIGS. 3 and 4 show an embodiment of a computer-implemented method of the present disclosure that has two nested loops, where each tuple contains two points (one point is a process variables point, the other point is an environment corner point). As will be described further below, the present disclosure also applies to computer-implemented methods that have more than two nested loops, where each tuple contains more than two points.

Figure 5:
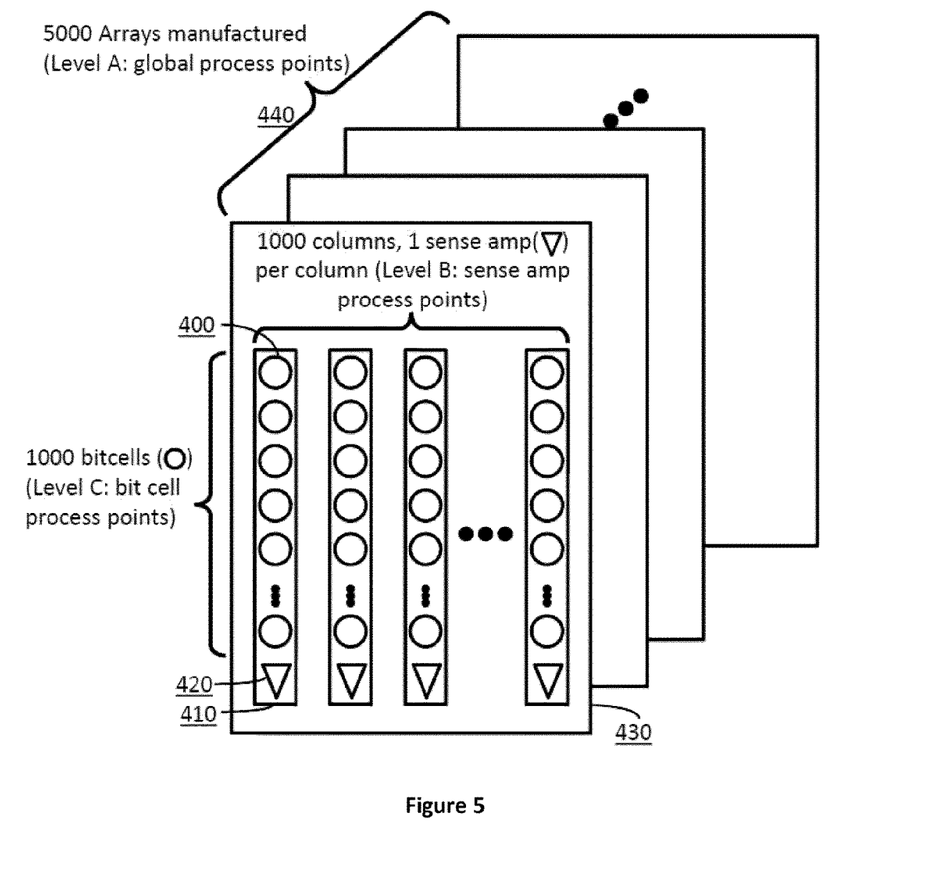
FIG. 5 shows an example of a hierarchical organization of a memory array.

The following embodiment takes advantage of the hierarchical organization of an ECD such as, for example, the ECD of FIG. 5, which shows an hierarchical organization of a memory array 440. At the lowest level of the memory hierarchy is a bitcell 400, which holds a single bit of information. Then, a set of bitcells (say, 1000 rows' worth) are organized into a single column 410. There is other circuitry in the column, such as a sense amp (420). A set of columns (say, 1000 columns' worth) is organized into an overall memory array 430. There may be other circuitry at the array level as well. The number of bitcells in a column, and the number of columns in the array, depends on the number of bits the array needs to hold, and other design choices, such as: number of redundant rows, number of redundant columns, type of error correction, bitcell topology choice, and sense amp topology choice. While there are other variants of how to hierarchically organize memory circuitry/memory architectures), we will use this organization as a prototypical example, without loss of generality.

FIG. 5 also illustrates hierarchical levels of process point samples. At the outer level (level A), let us consider the manufacturing of multiple dies (say, 5000). This amounts to 5000 copies of the overall array 440. One level inwards is the level B, where we consider one column at a time 410. One more level inwards is the level C, where we consider one bitcell at a time 400. As we will see shortly, levels A, B, and C might be used to form three nested loops of Monte Carlo sampling. We might even consider a fourth nested loop, level D, where we would consider the effects across>1 PVT corners.

Figure 6:
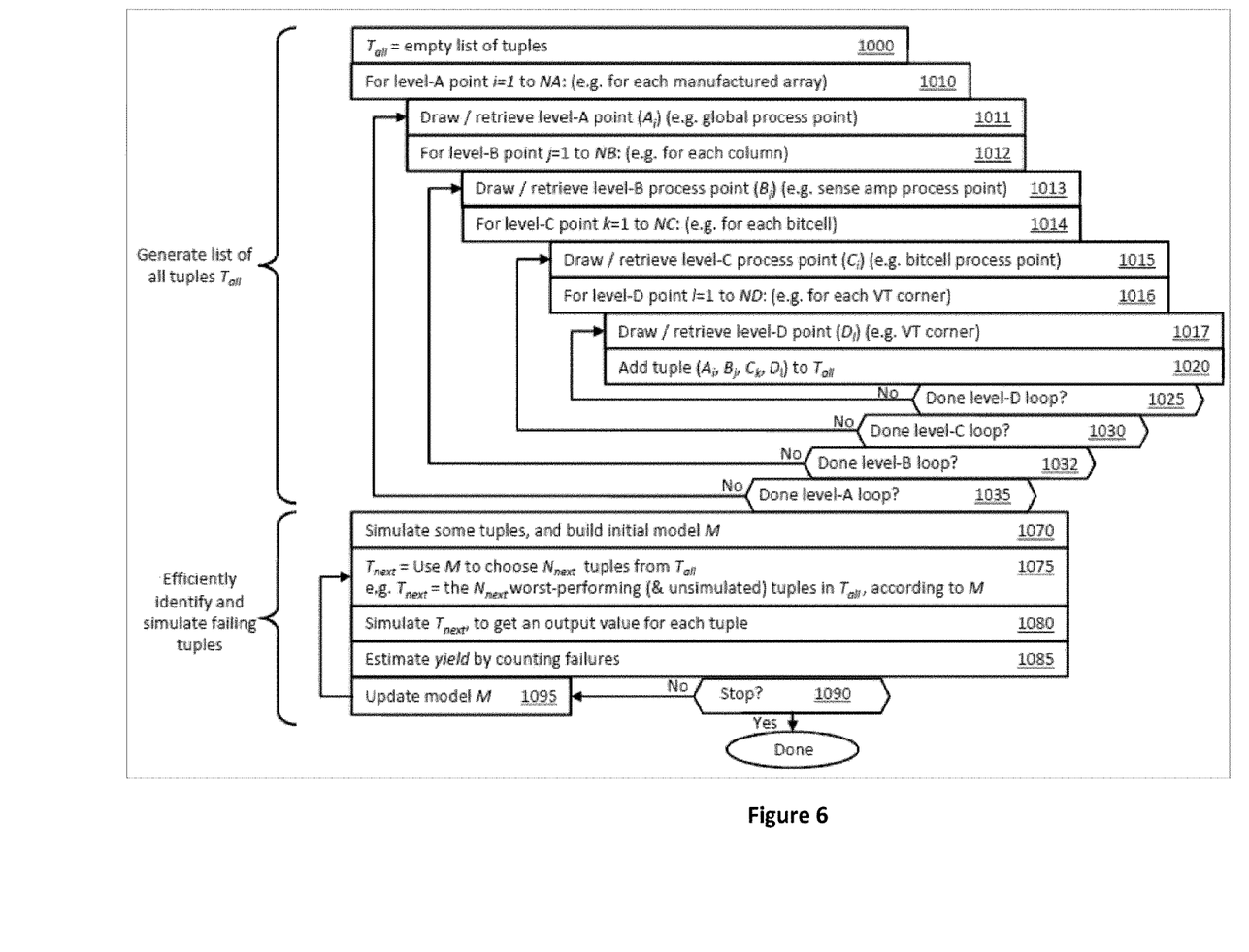
FIG. 6 shows yet another embodiment of a computer-implemented method in accordance with the present disclosure.

FIG. 6 is a flowchart of another embodiment of a computer-implemented method to identify failures of an ECD in accordance with the present disclosure. The computer-implemented method of FIG. 6 is described with respect to ECD of FIG. 5, has four nested loops, and each tuple contains four points. The outermost loop does Monte Carlo sampling on the manufactured arrays 440, the next-inner loop does Monte Carlo sampling on the columns 410 (sense amp 420), the next inner loop does Monte Carlo sampling on the bitcells 400, and the innermost loop covers PVT corners. Actions 1000 to 1035 perform the first main step, to generate a list of all tuples $T_{all}$. Actions 1070 to 1095 perform the second main step, to efficiently identify and simulate the failing tuples (a subset of $T_{all}$). The behavior of FIG. 6 is similar to the behavior of FIG. 4, except now each tuple has four points in it rather than two.

Importantly, for speed reasons, the simulation at actions 1070 and 1080 do not need to be at the whole array 440 level (that is, the entire ECD does not need to be simulated), but can instead be at some smaller, faster-to-simulate circuit (a sub-circuit of the ECD) that captures the effect of $A_i$, $B_j$, $C_k$, and $D_l$ with sufficient accuracy. For example, it could be a simulation on a netlist with a single bitcell and a single sense amp (the bitcell and the sense amp define a sub-circuit), which might only take 0.5 s to simulate on a single core. As a specific example, it might simulate a read operation on a netlist containing a bitcell and sense amp, and output a "bitcell_read_success_at_PVT" value of "1" if the read operation is successful, and a "0" if unsuccessful. In this example, the read operation is a performance metric of the sub-circuit (and of the ECD) and, the ECD passes or fails based on the performance metric value of the sub-circuit's performance metric. Alternatively, the simulation could be on a small set of 5 or 10 bitcells, with only one bitcell varying according to $D_l$ (in this example, the 5 or 10 bitcells defined a sub-circuit of the ECD). Alternatively, simulation might be of a whole column (the whole column is a sub-circuit of the ECD), with only one bitcell varying according to $D_l$. As will be understood by the skill worker, each of these options trades off speed and accuracy differently.

Figure 7:
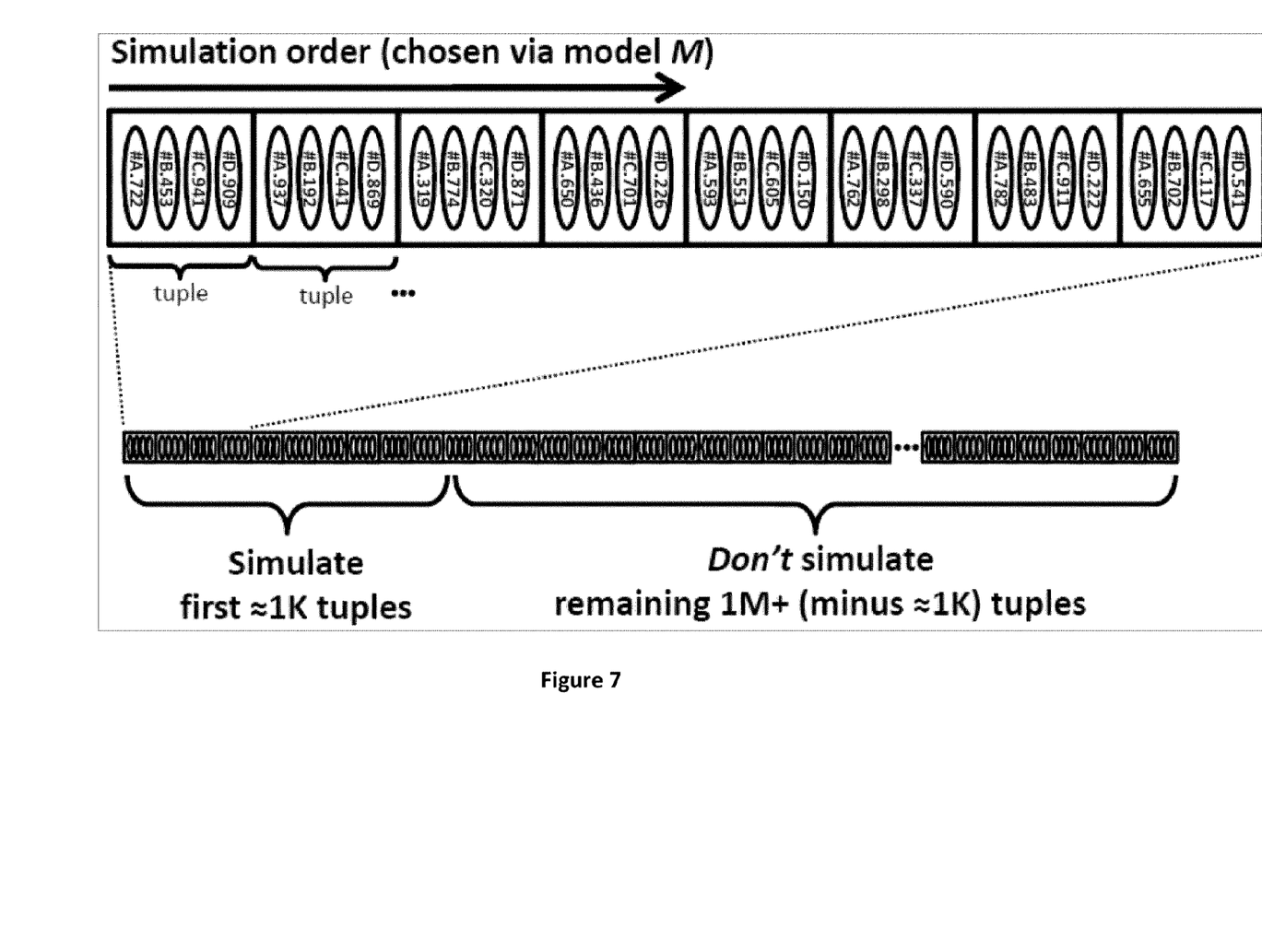
FIG. 7 shows tuples ordered in accordance with the computer-implemented method of FIG. 6.

FIG. 7 illustrates an aspect of behavior of the invention of FIG. 6. FIG. 7, at the bottom portion, shows a list of all possible tuples $T_{all}$, which may number in the millions or billions. FIG. 7, at the top portion, shows that the invention orders these tuples such that the model-predicted worst tuple is simulated first (point #A.722, point #B.453, point #C.941, point #D.909), the model-predicted next-worst tuple is simulated next (point #A.937, point #B.192, point #C.441, point #D.869), and so on.

The computer-implemented method of FIG. 6 will typically only need a few thousand simulations to analyze millions or billions of tuples. It accurately captures the statistical variation. It scales well to a large number of process variables (10K or more). Furthermore, unlike prior art approaches of FIG. 6, the computer-implemented method of FIG. 6 works on >1 PVT corner. Finally, it naturally handles a large number of process points or a large number of PVT corners, because it focuses its simulations on the tuples that are most likely to be worst case. Therefore, the invention is able to handle all five of the challenges given in the Description, unlike any of the prior art approaches.

Figure 8:
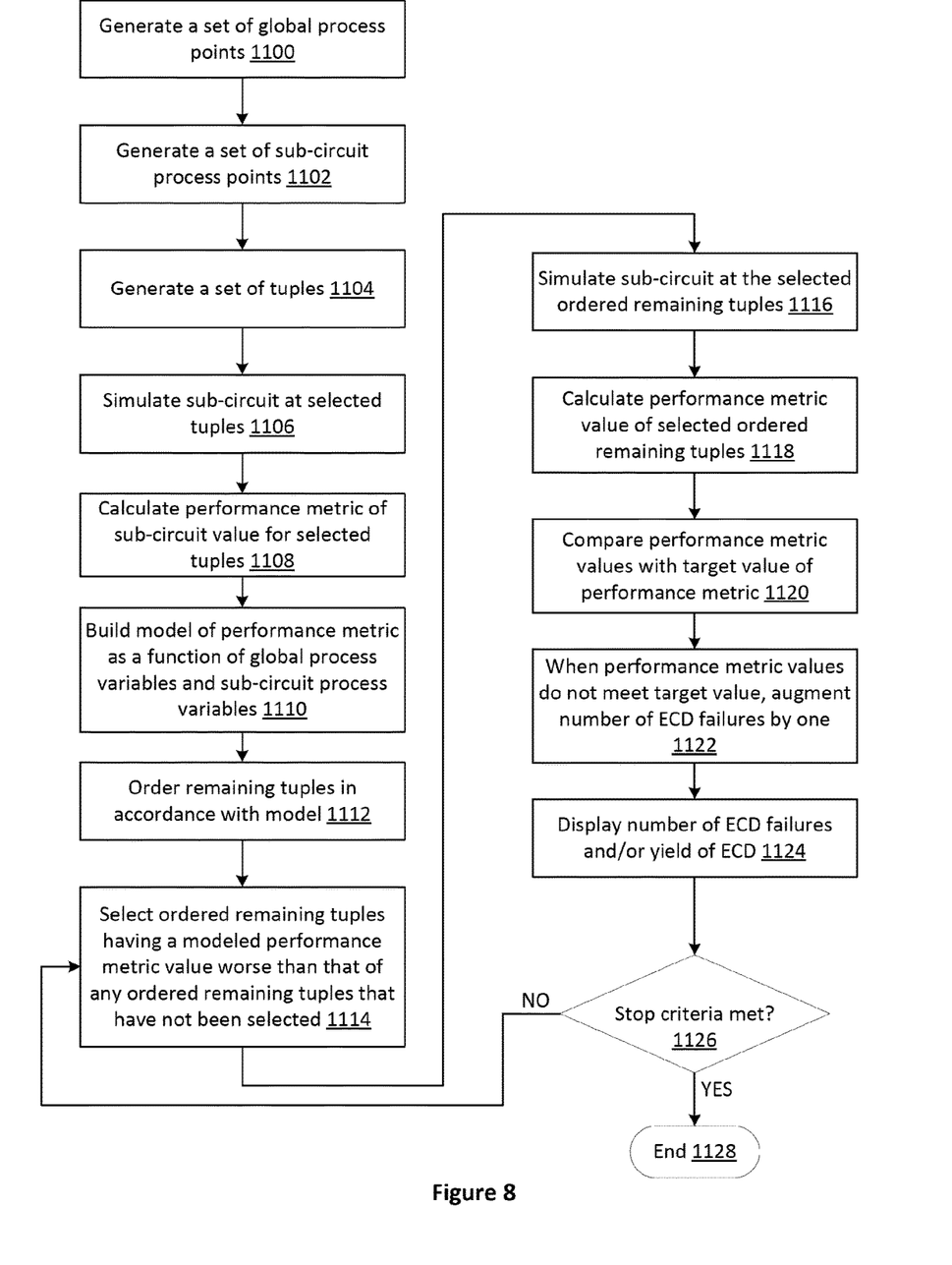
FIG. 8 shows a further embodiment of a computer-implemented method in accordance with the present disclosure.

FIG. 8 is a flowchart of another embodiment of a computer-implemented method to identify failures of an ECD in accordance with the present disclosure. The ECD in question defines a plurality of sub-circuits that are the same. That is, the ECD has a multiple instance of a sub-circuit. The ECD having associated thereto global process variables and each sub-circuit having associated thereto sub-circuit process variables. Each of the sub-circuit having associated thereto a performance metric that depends on the global process variables and the sub-circuit process variables. The ECD has a failure criteria that depends on the performance metric. That is, the ECD fails if the performance metric of the sub-circuit fails to meet a target performance metric value. The global process variables have associated thereto a probability distribution and, the sub-circuit process variables have associated thereto a respective probability distribution.

At action 1100, a set of global process points is generated. This can be achieved by sampling (e.g., using Monte Carlo sampling) the probability distribution of the global process points.

At action 1102, a set of sub-circuit process points is generated. This can be achieved by (e.g., using Monte Carlo sampling) the probability distribution of the sub-circuit process points.

At action 1104, a set of tuples is generated by combining each point of the set of global process points generated at action 1000 with each point of the set of sub-circuit points generated at action 1102. The total number of tuples generated is equal to the product of the number of global process points generated at action 1100 times the number of sub-circuit process points generated at action 1102.

At action 1106, the sub-circuit is simulated at selected tuples generated at action 44. The number of tuples selected is less than the total number tuples. For example, the number of tuples can range from 10-100. The selection of the tuples can be based on the global process variables values of the tuples and/or on the sub-circuit process variables. For example, the selection of the tuples can be based on the global process variable values (probability values) being lower than a threshold value. Alternatively, the selection of the tuples can be based on the sub-circuit process variable values being below a respective threshold values. The simulation of the sub-circuit can be effected using any suitable simulation program such as, for example, a SPICE circuit simulator. At action 1108, a value of a performance metric of the sub-circuit is calculated for each of the tuples that was simulated at action 1106. The performance metric has associated thereto a target performance metric value that must be met in order for the ECD (and the sub-circuit) to pass testing, otherwise, the ECD fails.

At action 1110, a regression model of the performance metric of the sub-circuit, as a function of the process variables and of the environment variables, is built in accordance with the performance metric values obtained at action 1108. The regression model can be of any suitable type, such as, for example linear models, polynomial models, spline models, Gaussian process models, neural networks, MARS models (J. H. Friedman, Multivariate Adaptive Regression Splines, Annals of Statistics, Vol. 19, No. 1, 1991), fast function extraction (FFX) models (T. McConaghy, High-dimensional statistical modeling and analysis of custom integrated circuits, Proc. Custom Integrated Circuits Conference, September 2011), or combinations thereof; these are all within the scope of the present disclosure.

At action 1112, the tuples that have not been used in building the model at action 1110 are ordered as a function of the model. That is, the performance metric of each tuple is calculated with the model and the tuples are ordered in accordance with their modeled performance metric values. The ordering is, with respect to a target performance metric, from the worse performance metric value to the best performance metric value.

Actions 1114-1122 are to calculate the number of ECD failures. At action 1114, a batch of ordered tuples is selected (e.g., 10-1000 tuples). These are selected from the tuples that were not used to build the model at action 1110. The selection of these tuples is based on which remaining tuples (the tuples not used to build the model) have the worst performance metric values. For example, when the remaining tuples are ordered in decreasing order starting with the tuple having the worst modeled performance metric value, the first 10-1000 (as an example) are selected. At action 1116, the sub-circuit is simulated at the tuples selected at action 1114 and a performance metric value of the sub-circuit is calculated at action 1118. At action 1120, a comparison between these calculated values and a target performance metric value is effected. At action 1122, a number of the instances of failure of the ECD is updated each time tuple fails to meet the target performance metric value.

At action 1124, a display of ECD failures and/or yield of the ECD is presented. This takes place on a display device operationally connected to the processor or processors that are carrying out actions 40-62.

The method depicted at FIG. 8 may also include action 1126, which determines if a stop criteria has been met. When the stop criteria has been met, the method ends at action 1128. When the stop criteria has not been met, the method loops back to action 1114 where the next batch of ordered remaining tuples is selected. For example, if the first batch of ordered remaining tuples contained tuples 1-100, the next batch will include tuples 101-200. Examples of stop criteria include: a user of the method stopping the computer-implemented method; the number of simulations (number of tuples) exceeds a threshold number of simulations; the runtime of the computer-implemented method has surpassed a maximum runtime; the number of ECD failures exceeds a maximum value; the lower bound of an estimated yield is higher than a threshold value; the upper bound of the estimated yield of the ECD is lower than a threshold value; etc. Optionally, subsequent to the stop criteria not being met at action 1126, the model built at action 1110 can be updated using the simulation data used obtained at action 1118. The then remaining tuples are reordered, at action 1112, as a function of the updated model and the computer-implemented method proceeds to action 1114 et seq.

As will be understood by the skilled worker, the computer-implemented method shown at FIG. 8 can be modified to consider not only global process variables and sub-circuit process variables but also pre-determined environment corners (e.g. VT corners). These pre-determined environment corners would come in play at action 1104 where the tuples would be generated to each include an additional term, which would be an environment corner. The total number of tuples resulting from the consideration of the pre-determined environment corners would be equal to the number of tuples generated for the global process variable combined with the sub-circuit process variables, times the number of pre-determined environment corners.

Variation-aware design tools configure to execute computer-implemented method in accordance with the present disclosure can be used to, for example, to carry out three-sigma analysis (1000-5000 Monte Carlo samples) on a moderate to large number of PVT corners; to carry out high-sigma analysis (1M-1G or more Monte Carlo samples) with a small to large number of PVT corners; to carry out analysis of memory arrays or columns, without PVT variation; and to carry out analysis of memory arrays or columns, with a small to large number of PVT corners. Prior art variation-aware design tools are not capable of efficiently carrying out the above listed example cases.

By generating tuples of process points and/or environment corners of an ECD and by ordering these tuples, the present disclosure allows for a quicker evaluation of the ECD. The present disclosure also allows the tackling of problems that have thus far been too complex and/or to time-consuming to tackle.

In the preceding description, for purposes of explanation, numerous details are set forth in order to provide a thorough understanding of the embodiments. However, it will be apparent to one skilled in the art that these specific details are not required. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform actions in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, computer (digital computer) or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A computer-implemented method to identify failures of an electrical circuit design (ECD), the ECD defining a plurality of sub-circuits, each sub-circuit being the same, the ECD having associated thereto global process variables, each sub-circuit having associated thereto sub-circuit process variables, each sub-circuit having associated thereto a performance metric, the performance metric being dependent on the global process variables and on the sub-circuit process variables, the ECD having a failure criteria that depends on the performance metric, the global process variables having associated thereto a probability distribution of the global process variables, the sub-circuit process variables having associated thereto a probability distribution of the sub-circuit process variables, the computer-implemented method comprising:

generating a set of global process points from the probability distribution of the global process variables;

generating a set of sub-circuit process points from the probability distribution of the sub-circuit process variables;

generating a set of tuples by combining each point of the set of global process points with each point of the set of sub-circuit process points, each tuple comprising one global process point and one first sub-circuit process point;

simulating one of the sub-circuits at selected tuples to obtain simulation data, non-simulated tuples being remaining tuples;

in accordance with the simulation data, calculating a simulated performance metric value of the sub-circuit for each of the selected tuples;

in accordance with the simulated performance metric values, building a model of the performance metric as a function of the global process variables and as a function of the sub-circuit process variables;

calculating, in accordance with the model, a modeled performance metric value for each remaining tuple;

ordering the remaining tuples as a function of the modeled performance metric values to obtain ordered remaining tuples;

calculating a number of ECD failures by:
selecting a pre-determined number of ordered remaining tuples to obtain selected ordered remaining tuples, the selected ordered remaining tuples being the remaining tuples that have a modeled performance metric value that is worse than that of any of the non-selected ordered remaining tuples;

simulating the sub-circuit at the selected ordered remaining tuples to obtain additional simulation data;

calculating, as a function of the additional simulation data, a performance metric value of the sub-circuit performance metric for each of the selected ordered remaining tuples;

comparing the performance metric value of each of the selected ordered remaining tuples with a target value of the performance metric; and when the performance metric value of a selected ordered remaining tuple does not meet the target value of the performance metric, augmenting a number of ECD failures by one; and displaying at least one of the number of ECD failures and an estimated yield of the ECD, the estimated yield of the ECD being a function of the number of ECD failures.

2. The computer-implemented method of claim 1 wherein generating a set of global process points from the probability distribution of the global process variables includes sampling the probability distribution of the global process variables.

3. The computer-implemented method of claim 1 wherein generating a set of sub-circuit process points from the probability distribution of the sub-circuit process variables includes sampling the probability distribution of the sub-circuit process variables.

4. The computer-implemented method of claim 1 wherein simulating a performance metric of the sub-circuit at the selected tuples is preceded by selecting the selected tuples.

5. The computer-implemented method of claim 4 wherein selecting the selected tuples includes at least one of selecting tuples that have a global process variable probability that is lower than a pre-determined threshold value and selecting tuples that have a sub-circuit process variable probability that is lower than another pre-determined threshold value.

6. The computer-implemented method of claim 1 wherein the estimated yield of the ECD is also a function of a total number of global process points.

7. The computer-implemented method of claim 1 wherein the model is a regression model that includes at least one of a linear model, a polynomial model, a spline model, a Gaussian process model, a neural network, a multivariate adaptive regression spline model, and a fast function extraction model.

8. The computer-implemented method of claim 1 wherein the computer-implemented method has a stop criteria, the computer-implemented method further comprising, when stop criteria is not met:

selecting, from the ordered remaining tuples that have not been selected, an additional number of ordered remaining tuples to obtain additional selected ordered remaining tuples, the additional selected ordered remaining tuples being tuples that have a modeled performance metric value that is worse than that of any of ordered remaining tuples that have not been selected;

simulating the sub-circuit at the additional selected ordered remaining tuples to obtain supplemental simulation data;

calculating, as a function of the supplemental simulation data, a performance metric value of the sub-circuit for each of the additional selected ordered remaining tuples;

comparing the performance metric value of each of the sub-circuit for the additional selected ordered remaining tuples with a target value of the performance metric; and when the performance metric value of an additional selected ordered remaining tuple does not meet the target value of the performance metric, augmenting a number of ECD failures by one.

9. The computer-implemented method of claim 8 wherein the stop criteria includes at least one of: a number of simulations exceeds a respective maximum value, a runtime of the computer-implemented method surpassing a maximum runtime limit, a number of ECD failures exceeding a respective maximum value, a lower bound of an estimated yield of the ECD exceeding a respective threshold value, and an upper bound of the estimated yield of the ECD being lower than a respective threshold value.

10. The computer-implemented method of claim 8 wherein selecting, from the ordered remaining tuples that have not been selected, the additional number of ordered remaining tuples is preceded by updating the model in accordance with the additional simulation data.

11. A computer-implemented method to identify failures of an electrical circuit design (ECD), the ECD having associated thereto process variables, environmental variables, and performance metrics, the performance metrics being dependent on the process variables and on the environmental variables, the environmental variables having associated thereto a series of pre-defined corners, the process variables having a probability distribution, the computer-implemented method comprising:

generating a set of process points from the probability distribution of the process variables;

generating a set of tuples by combining each point of the set of process points with each pre-defined corner, each of the tuples comprising one process point of the set of process points and one pre-defined corner;

simulating the ECD at selected tuples to obtain simulation data, non-simulated tuples being remaining tuples;

in accordance with the simulation data, calculating a simulated performance metric value for each of the selected tuples;

in accordance with the simulated performance metric values, building a model of the performance metric as a function of the process variables and as a function of the environmental variables;

calculating, in accordance with the model, a modeled performance metric value for each remaining tuple;

ordering the remaining tuples as a function of the modeled performance metric values to obtain ordered remaining tuples;

calculating a number of ECD failures by:
selecting a pre-determined number of ordered remaining tuples to obtain selected ordered remaining tuples, the selected ordered remaining tuples being tuples that have a modeled performance metric value that is worse than that of any of the ordered remaining tuples that have not been selected;

simulating the ECD at the selected ordered remaining tuples to obtain additional simulation data;

calculating, as a function of the additional simulation data, a performance metric value for each of the selected ordered remaining tuples;

comparing the performance metric value of each of the selected ordered remaining tuples with a target value of the performance metric; and when the performance metric value of a selected ordered remaining tuple does not meet the target value of the performance metric, augmenting a number of ECD failures by one; and displaying at least one of the number of ECD failures and an estimated yield of the ECD, the estimate yield of the ECD being a function of the number of ECD failures.

12. The computer-implemented method of claim 10 wherein generating a set of process points from the probability distribution of the process variables includes sampling the probability distribution of the process variables.

13. The computer-implemented method of claim 11 wherein simulating a performance metric of the ECD at the selected tuples is preceded by selecting the selected tuples.

14. The computer-implemented method of claim 11 wherein selecting the selected tuples includes selecting tuples that have a process variable probability that is lower than a pre-determined threshold value.

15. The computer-implemented method of claim 11 wherein the estimated yield of the ECD is also a function of a total number of process points.

16. The computer-implemented method of claim 11 wherein the model is a regression model that includes at least one of a linear model, a polynomial model, a spline model, a Gaussian process model, a neural network, a multivariate adaptive regression spline model, and a fast function extraction model.

17. The computer-implemented method of claim 11 wherein the computer-implemented method has a stop criteria, the computer-implemented method further comprising, when stop criteria is not met:

selecting, from the ordered remaining tuples that have not been selected, an additional number of ordered remaining tuples to obtain additional selected ordered remaining tuples, the additional selected ordered remaining tuples being tuples that have a modeled performance metric value that is worse than that of any of ordered remaining tuples that have not been selected;

simulating the ECD at the additional selected ordered remaining tuples to obtain supplemental simulation data;

calculating, as a function of the supplemental simulation data, a performance metric value of the ECD for each of the additional selected ordered remaining tuples;

comparing the performance metric value of each of the ECD for the additional selected ordered remaining tuples with a target value of the performance metric; and when the performance metric value of an additional selected ordered remaining tuple does not meet the target value of the performance metric, augmenting a number of ECD failures by one.

18. The computer-implemented method of claim 17 wherein the stop criteria includes at least one of: a number of simulations exceeds a respective maximum value, a runtime of the computer-implemented method surpassing a maximum runtime limit, a number of ECD failures exceeding a respective maximum value, a lower bound of an estimated yield of the ECD exceeding a respective threshold value, and an upper bound of the estimated yield of the ECD being lower than a respective threshold value.

19. The computer-implemented method of claim 17 wherein selecting, from the ordered remaining tuples that have not been selected, the additional number of ordered remaining tuples is preceded by updating the model in accordance with the additional simulation data.

* * * * *